United States Patent
Wang et al.

(10) Patent No.: US 12,315,111 B2
(45) Date of Patent: May 27, 2025

(54) IMAGE ENHANCEMENT METHOD AND APPARATUS, AND TERMINAL DEVICE

(71) Applicant: SHENZHEN INSTITUTES OF ADVANCED TECHNOLOGY CHINESE ACADEMY OF SCIENCES, Guangdong (CN)

(72) Inventors: Shuqiang Wang, Guangdong (CN); Senrong You, Guangdong (CN); Yiqian Lu, Guangdong (CN); Shengye Hu, Guangdong (CN)

(73) Assignee: SHENZHEN INSTITUTES OF ADVANCED TECHNOLOGY CHINESE ACADEMY OF SCIENCES, Guangdong (CN)

( * ) Notice: Subject to any disclaimer, the term of this patent is extended or adjusted under 35 U.S.C. 154(b) by 388 days.

(21) Appl. No.: 17/779,718

(22) PCT Filed: Nov. 25, 2019

(86) PCT No.: PCT/CN2019/120685
§ 371 (c)(1),
(2) Date: May 25, 2022

(87) PCT Pub. No.: WO2021/102644
PCT Pub. Date: Jun. 3, 2021

(65) Prior Publication Data
US 2022/0414849 A1     Dec. 29, 2022

(51) Int. Cl.
*G06K 9/00*     (2022.01)
*G06N 3/084*    (2023.01)
*G06T 5/10*     (2006.01)

(52) U.S. Cl.
CPC .............. *G06T 5/10* (2013.01); *G06N 3/084* (2013.01); *G06T 2207/20064* (2013.01); *G06T 2207/20081* (2013.01); *G06T 2207/20084* (2013.01)

(58) Field of Classification Search
CPC ........ G06N 3/045; G06N 3/084; G06N 3/048; G06N 3/044; G06N 3/047; G06N 3/08;
(Continued)

(56) References Cited

U.S. PATENT DOCUMENTS

| 10,380,724 B1 | 8/2019 | Kim et al. |
| 2016/0161448 A1* | 6/2016 | Huang ................. G01N 27/82 324/220 |

(Continued)

FOREIGN PATENT DOCUMENTS

| CN | 103279940 A | 9/2013 |
| CN | 106920223 A | 7/2017 |

(Continued)

OTHER PUBLICATIONS

Fayaz Ali Dharejo, Farah Deeba, Yuanchun Zhou, Bhagwan Das, Munsif Ali Jatoi, Muhammad Zawish, Yi Du, and Xuezhi Wang. 2021. TWIST-GAN: Towards Wavelet Transform and Transferred GAN for Spatio-Temporal Single Image Super Resolution. ACM Trans. Intell. Syst. Technol. 12, 6, Article 71 (Dec. 2021) (Year: 2021).*

(Continued)

*Primary Examiner* — Alex Kok S Liew
(74) *Attorney, Agent, or Firm* — Brooks Kushman P.C.

(57) ABSTRACT

Disclosed by the present application are an image enhancement method and apparatus, a terminal device and a computer-readable storage medium. The image enhancement method comprises: obtaining an image to be processed; performing a wavelet transform operation on the image to
(Continued)

obtain raw feature information of the image, the raw feature information comprising global contour feature information, transversal detail feature information, longitudinal detail feature information, and contrast detail feature information; inputting the raw feature information into a trained target network for processing to obtain corresponding reconstruction feature information, the reconstruction feature information comprising global contour reconstruction information, transversal detail reconstruction information, longitudinal detail reconstruction information, and contrast detail reconstruction information; performing an inverse wavelet transform operation on the reconstruction feature information to obtain a reconstructed image; the resolution of the reconstructed image is higher than the resolution of the image to be processed.

16 Claims, 6 Drawing Sheets

(58) Field of Classification Search
CPC ........ G06N 3/088; G06N 7/01; G06N 3/0475; G06N 3/094; G06T 5/70; G06T 2207/20081; G06T 2207/20084; G06T 2211/424; G06T 11/006; G06T 2207/10088; G06T 2207/20064; G06T 2211/441; G06T 5/10; G06T 5/60; G06T 11/00; G06T 11/003; G06T 11/008; G06T 2211/421; G06T 2211/444; G06T 7/0012; G06T 11/005; G06T 19/20; G06T 2207/10081; G06T 2207/20224; G06T 2211/448; G06T 2211/452; G06T 2211/456; G06T 3/4046; G06T 3/4053; G06T 5/50; G06T 7/0002
See application file for complete search history.

(56) References Cited

U.S. PATENT DOCUMENTS

| | | | |
|---|---|---|---|
| 2018/0075581 | A1 | 3/2018 | Shi et al. |
| 2019/0325620 | A1 | 10/2019 | Adler et al. |
| 2019/0333219 | A1 | 10/2019 | Xu et al. |
| 2020/0013196 | A1* | 1/2020 | Vishnu Vardhan ....... G06T 5/50 |
| 2020/0090382 | A1* | 3/2020 | Huang ................... G06N 3/084 |
| 2022/0076067 | A1* | 3/2022 | Marie-Nelly .......... G06V 10/82 |

FOREIGN PATENT DOCUMENTS

| | | |
|---|---|---|
| CN | 107194904 A | 9/2017 |
| CN | 109559276 A | 4/2019 |
| CN | 109801221 A | 5/2019 |
| CN | 110119780 A | 8/2019 |
| CN | 110222758 A | 9/2019 |
| CN | 110443867 A | 11/2019 |
| CN | 110458758 A | 11/2019 |

OTHER PUBLICATIONS

International Search Report and Written Opinion for Application No. PCT/CN2019/120685, mailed Jul. 28, 2020, 13 Pages.
Yang, S. C. et al., "Super-resolution reconstruction algorithm based on deep learning mechanism and wavelet fusion," Journal of Beijing University of Aeronautics and Astronautics, vol. 46, Issue 1, pp. 189-197, 2020.

* cited by examiner

IMAGE ENHANCEMENT METHOD AND APPARATUS, AND TERMINAL DEVICE

CROSS REFERENCE TO RELATED APPLICATION

The present application is a National Stage of PCT Application No. PCT/CN2019/120685 filed on Nov. 25, 2019, the content of which is incorporated herein by reference thereto.

TECHNICAL FIELD

The present application involves in the field of image processing technologies, and particularly relates to an image enhancement method, an image enhancement apparatus and a terminal device.

BACKGROUND

With the development of image processing technologies, image analysis and recognition are widely used in fields such as medical imaging, video monitoring, remote sensing imaging, face recognition etc. In a specific application, due to limitations of a camera environment or a camera device, collected images are usually low-resolution images, and the low-resolution images are required to be converted into high-resolution images to further analyze and recognize the images.

However, in the prior art, the high-resolution images obtained by converting from the low-resolution images are relatively fuzzy, which affects the accuracy of subsequent image analysis and recognition.

SUMMARY

In view of this, embodiments of the present application provide an image enhancement method, an image enhancement apparatus and a terminal device to solve the problem that the high-resolution images obtained by converting from the low-resolution images are relatively fuzzy in the prior art.

A first aspect of the present application provides an image enhancement method, which includes:
acquiring an image to be processed;
performing a wavelet transform operation on the image to be processed to acquire raw feature information of the image to be processed, wherein the raw feature information includes global contour feature information, transversal detail feature information, longitudinal detail feature information, and diagonal detail feature information;
inputting the raw feature information into a trained target network for processing to acquire corresponding reconstruction feature information; wherein the reconstruction feature information includes global contour reconstruction information, transversal detail reconstruction information, longitudinal detail reconstruction information and diagonal detail reconstruction information, the target network is a generator group acquired through training a first sample image and a corresponding second sample image based on four generative adversarial networks, and resolution of the first sample image is higher than resolution of the second sample image;
performing an inverse wavelet transform operation on the reconstruction feature information to acquire a reconstructed image; where resolution of the reconstructed image is higher than resolution of the image to be processed.

A second aspect of the present application provides an image enhancement apparatus, which includes:
a to-be-processed image acquisition unit configured to acquire an image to be processed;
a wavelet transform unit configured to perform a wavelet transform operation on the image to be processed to acquire raw feature information of the image to be processed, wherein the raw feature information includes global contour feature information, transversal detail feature information, longitudinal detail feature information and diagonal detail feature information;
a reconstruction feature information acquisition unit configured to input the raw feature information into a trained target network for processing to acquire corresponding reconstruction feature information; wherein the reconstruction feature information includes global contour reconstruction information, transversal detail reconstruction information, longitudinal detail reconstruction information and diagonal detail reconstruction information, the target network is a generator group acquired through training a first sample image and a corresponding second sample image based on four generative adversarial networks, and resolution of the first sample image is higher than resolution of the second sample image;
an inverse wavelet transform unit configured to perform an inverse wavelet transform operation on the reconstruction feature information to acquire a reconstructed image;
where resolution of the reconstructed image is higher than resolution of the image to be processed.

A third aspect of the present application provides a terminal device, which includes a memory, a processor and a computer program stored in the memory and executable on the processor, and the processor, when executing the computer program, implements the above-mentioned image enhancement method.

A fourth aspect of the present application provides a computer-readable storage medium, on which a computer program is stored, and the computer program, when executed by a processor, implements the above-mentioned image enhancement method.

A fifth aspect of the present application provides a computer program product, and the computer program product, when executed on a terminal device, causes the terminal device to implement the image enhancement method described in the first aspect.

Beneficial Effect

In the embodiments of the present application, the raw feature information including the global contour feature information, transversal detail feature information, longitudinal detail feature information and diagonal detail feature information is obtained by performing the wavelet transform operation on the image to be processed, and the reconstruction feature information including the global contour reconstruction information, transversal detail reconstruction information, longitudinal detail reconstruction information and diagonal detail reconstruction information is acquired through the trained target network respectively, and then the inverse wavelet transform is performed on the reconstruction feature information to acquire the reconstructed image having higher resolution than the resolution of the image to be processed. Since the target network is a generator group acquired through training the first sample image and the corresponding second sample image based on four generative adversarial networks, after the global contour feature information and the detail feature information in all directions of the image to be processed are distinguished, the reconstruction feature information including the global contour reconstruction information, transversal detail reconstruction information, longitudinal detail reconstruction information and diagonal detail feature information can be generated correspondingly and accurately through the target network, and then the inverse wavelet transform is performed to make every detail information be reconstructed accurately and separately, therefore the final reconstructed image can be made clearer and more accurate.

BRIEF DESCRIPTION OF THE DRAWINGS

In order to more clearly describe the technical solutions in the embodiments of the present application or in the prior art, drawings that need to be used in the description for the embodiments or the prior art will be briefly introduced below, it is obvious that the drawings in the following description are only some embodiments of the present application, and other drawings may be obtained by those of ordinary skill in the art based on these drawings without creative work.

DETAILED DESCRIPTION

In the following description, for the purpose of illustration rather than limitation, specific details such as a specific system structure and technology etc. are proposed for a thorough understanding of the embodiments of the present application. However, it should be understood to those skilled in the art that the present application can also be implemented in other embodiments without these specific details. In other cases, detailed descriptions of well-known systems, apparatuses, circuits, and methods are omitted to avoid unnecessary details from obstructing the description of the present application.

Figure 1:
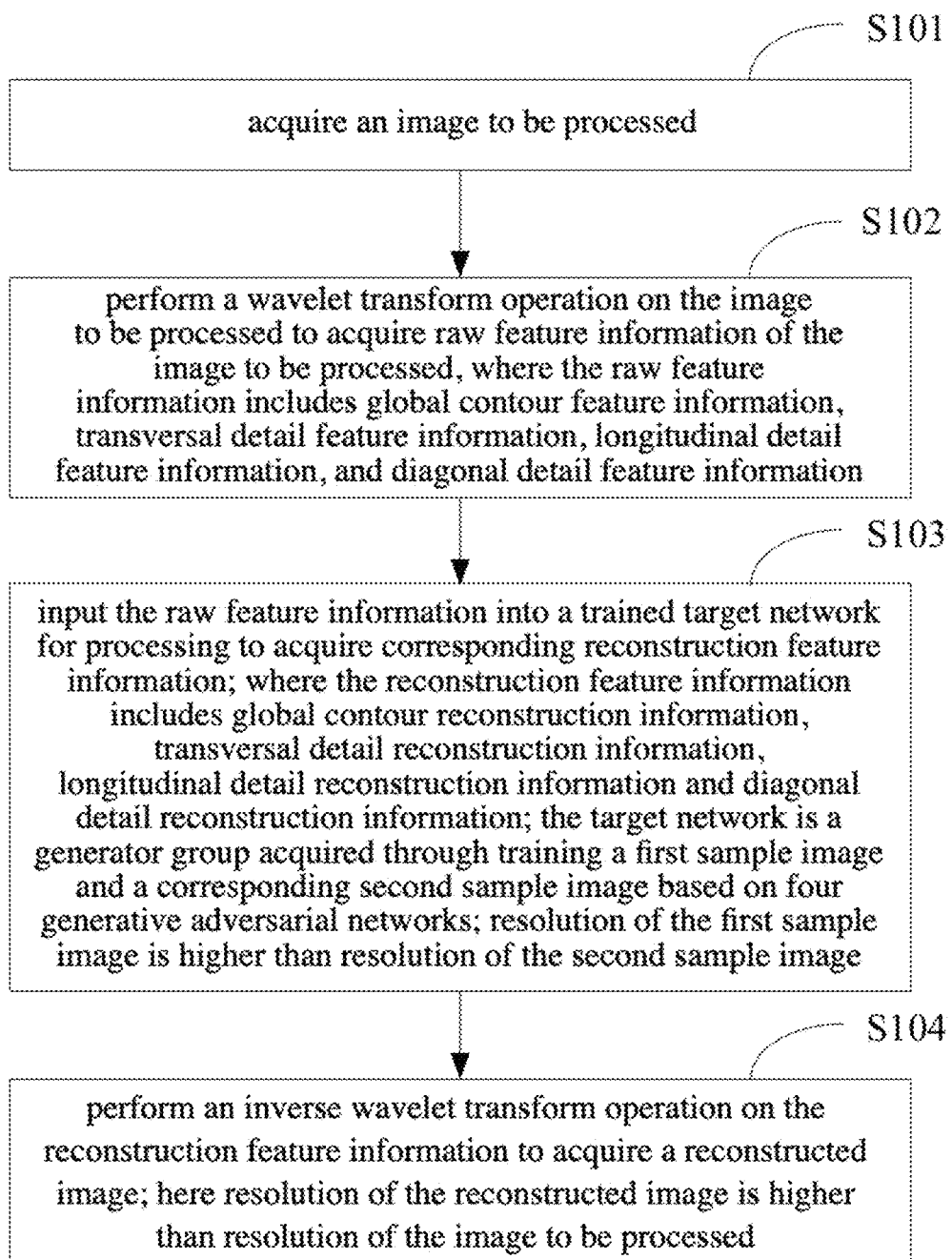
FIG. 1 is a schematic diagram of an implementation process of a first image enhancement method provided by the present application.

Please refer to FIG. 1, FIG. 1 is a schematic flowchart of a first image enhancement method provided by an embodiment of the present application. An execution subject of the image enhancement method in this embodiment is a terminal device, which includes but is not limited to a mobile terminal such as a smart phone, a tablet computer, and a PDA (Personal Digital Assistant) etc., and may also include a terminal device such as a desktop computer and a server etc. The image enhancement method as shown in FIG. 1 includes the following.

At S101: acquire an image to be processed.

The image to be processed is an image provided with a low resolution and requiring image enhancement, the image to be processed may be acquired by an image acquisition device, alternatively the image to be processed may be acquired through reading from a storage unit of a local terminal or a third party. According to a specific application scenario of the image enhancement method in an embodiment of the present application, the image to be processed may specifically be a low-resolution medical image, a low-resolution face image, a low-resolution remote sensing image, and the like.

At S102: perform a wavelet transform operation on the image to be processed to acquire raw feature information of the image to be processed, where the raw feature information includes global contour feature information, transversal detail feature information, longitudinal detail feature information, and diagonal detail feature information.

Figure 2:
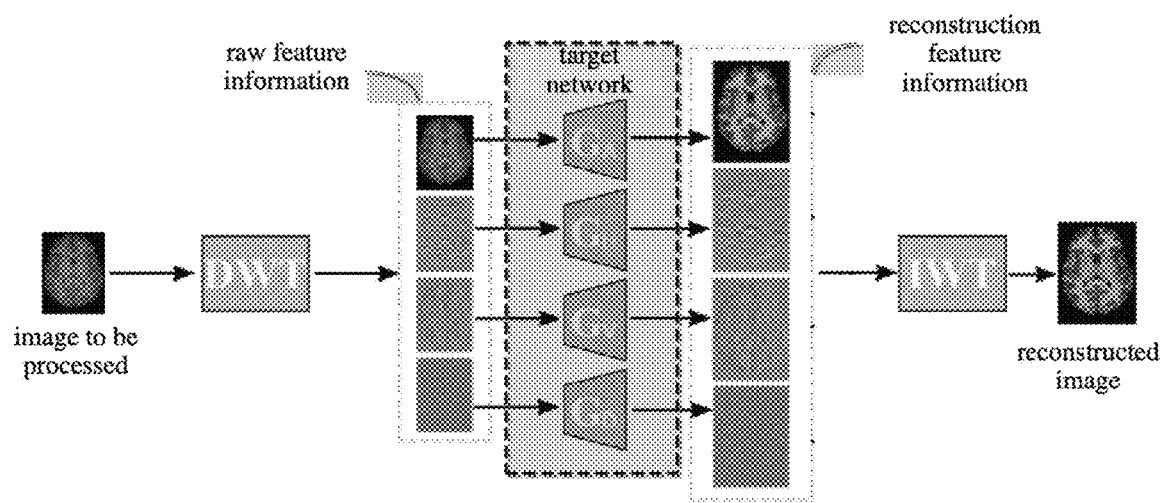
FIG. 2 is a schematic diagram of a flowchart of an image enhancement method provided by the present application.

The image to be processed is input into a discrete wavelet transform model to perform the wavelet transform operation on the image to be processed, so as to acquire the raw feature information of the image to be processed. Specifically, firstly spectrum information of the image to be processed is acquired according to a discrete wavelet transform function and various frequency components in the spectrum information are extracted; then the various frequency components are combined into four frequency combination components, and the four frequency combination components are separately converted into a spatial frequency domain to acquire the corresponding global contour feature information, transversal detail feature information, longitudinal detail feature information and diagonal detail feature information, and these four pieces of feature information are the raw feature information. As shown in FIG. 2, the image to be processed is input into the DWT (Discrete Wavelet Transformation) model to acquire the corresponding raw feature information, and the four images from top to bottom of the raw feature information are the global contour feature information, the transversal detail feature information, the longitudinal detail feature information and the diagonal detail feature information respectively.

Further, the wavelet transform operation is specifically a compactly supported orthogonal wavelet transform operation provided with symmetry.

Since the compactly supported orthogonal wavelet transform can speed up calculation speed and save operation time, and the symmetrical and compactly supported orthogonal wavelet transform can further effectively avoid phase distortion during image processing, thereby the extraction of the image feature information is more accurate. Specifically, an embodiment of the present application adopts an approximately symmetrical and compactly supported orthogonal wavelet transform function to perform wavelet transformation, and a mathematical expression of the approximately symmetrical and compactly supported wavelet transform is as follows:

$$x(t) = \sum_{k \in Z} u_{j_0,k} \phi_{j_0,k(t)} + \sum_{j=-\infty}^{j_0} \sum_{k \in Z} u_{j_0,k} \phi_{j_0,k(t)} \qquad [1]$$

where $\phi_{j,k}(t)=2^j\phi(2^jt-k)$ is a scale function, $\psi_{j,k}(t)=2^j\psi(2^jt-k)$ is a wavelet function; $u_{j,k}$ is a scale coefficient and is equal to inner product of x and $\phi_{j,k}$, i.e., $u_{j,k}=<x,\phi_{j,k}>$; $\omega_{j,k}$ is a wavelet coefficient and is equal to inner product of x and $\psi_{j,k}$, i.e., $\omega_{j,k}=<x,\psi_{j,k}>$; $j_0$ is an arbitrary value, which indicates an arbitrary starting scale.

Further, the image to be processed is specifically a three-dimensional image, and the performing the wavelet transform operation on the image to be processed to acquire the raw feature information of the image to be processed includes:
- at S10201: performing a wavelet transform operation on the image to be processed in an x-axis direction to acquire first spectrum information;
- at S10202: performing a wavelet transform operation on the first spectrum information in a y-axis direction to acquire second spectrum information;
- at S10203: performing a wavelet transform operation on the second spectrum information in a z-axis direction to acquire third spectrum information;
- at S10204: acquiring the raw feature information according to the third spectrum information.

The image to be processed in this embodiment of the present application is specifically a three-dimensional image, so it is necessary to perform a three-dimensional wavelet transform operation on this image to be processed, that is, three wavelet transform operations including the wavelet transform in the x-axis direction, the wavelet transform in the y-axis direction and the wavelet transform in the z-axis direction are performed in sequence to extract the frequency component information of the image to be processed in each direction, and then the frequency component information in each direction is converted into the spatial frequency domain to acquire the raw feature information.

Figure 3:
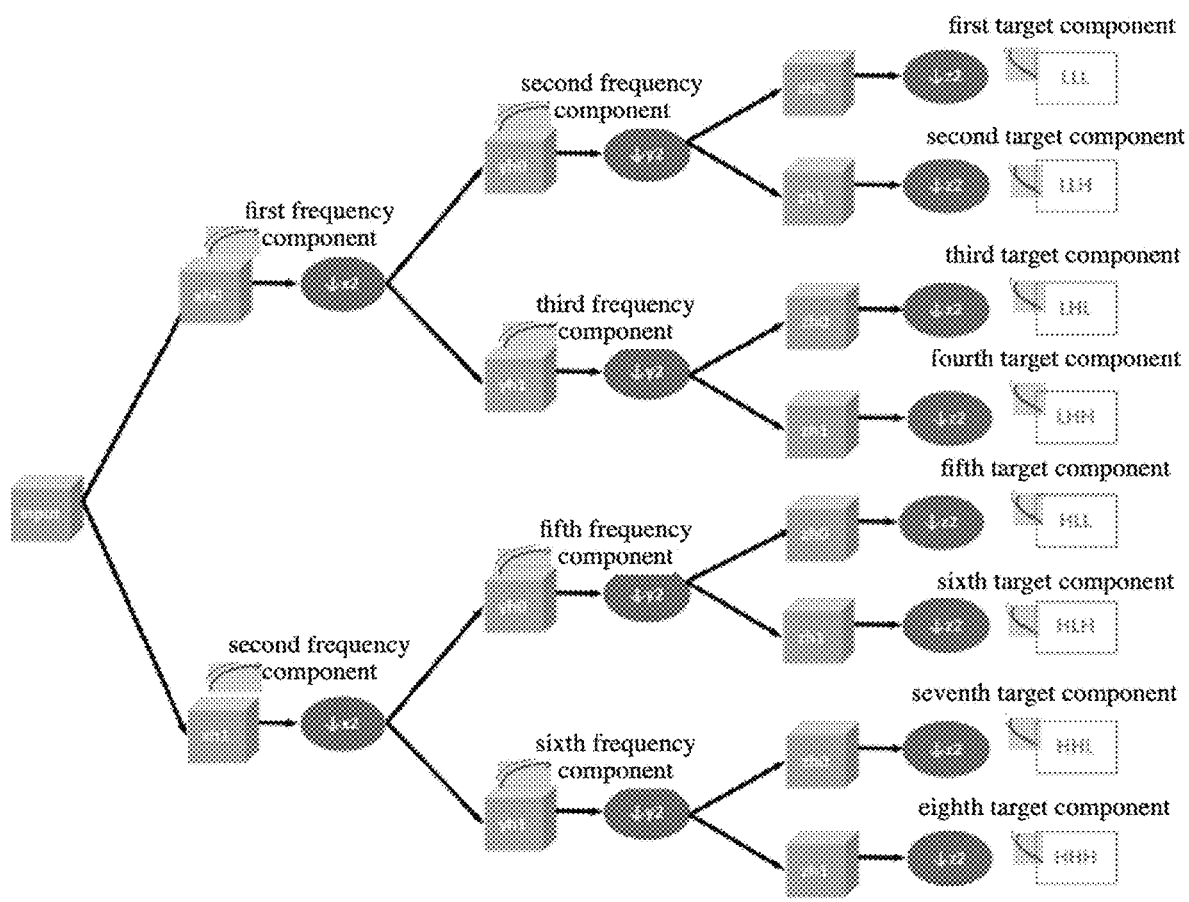
FIG. 3 is a schematic diagram of a wavelet transform operation provided by the present application.

Specifically, the schematic diagram of the three wavelet transform operations is shown in FIG. 3, where "↓x2" indicates a down-sampling operation with a sampling interval of 2 in the x-axis direction, "↓y2" indicates a down-sampling operation with a sampling interval of 2 in the y-axis direction, and "↓z2" indicates a down-sampling operation with a sampling interval of 2 in the z-axis direction, which are detailed below.

In the S10201, the wavelet transform operation is performed on the image to be processed in the x-axis direction to acquire the first spectrum information, and the first spectrum information includes a first frequency component and a second frequency component, where the first frequency component includes low-frequency component information in the x-axis direction, and the second frequency component includes high-frequency component information in the x-axis direction.

In the S10202, after the first spectrum information is down sampled, the wavelet transform operation is performed in the y-axis direction to acquire the second spectrum information, and the second spectrum information includes a third frequency component, a fourth frequency component, a fifth frequency component and the sixth frequency component. Specifically, the third frequency component includes low-frequency component information in the x-axis direction and low-frequency component information in the y-axis direction; the fourth frequency component includes low-frequency component information in the x-axis direction and high-frequency component information in the y-axis direction; the fifth frequency component includes high-frequency component information in the x-axis direction and low-frequency component information in the y-axis direction; and the sixth frequency component includes high-frequency component information in the x-axis direction and high-frequency component information in the y-axis direction.

In the S10203, after the second spectrum information is down sampled, the wavelet transform operation is performed in the z-axis direction to acquire the third spectrum information, and the third spectrum information includes eight frequency components.

In the S10204, after the eight frequency components of the third spectrum information are down sampled respectively, eight target components are acquired. Specifically, a first target component includes low-frequency component information in the x-axis direction, low-frequency component information in the y-axis direction and low-frequency component information in the z-axis direction; a second target component includes low-frequency component information in the x-axis direction, low-frequency component information in the y-axis direction and high-frequency component information in the z-axis direction; a third target component includes low-frequency component information in the x-axis direction, high-frequency component information in the y-axis direction and low-frequency component information in the z-axis direction; a fourth target component includes low-frequency component information in the x-axis direction, high-frequency component information in the y-axis direction and high-frequency component information in the z-axis direction; a fifth target component includes high-frequency component information in the x-axis direction, low-frequency component information in the y-axis direction and low-frequency component information in the z-axis direction; a sixth target component includes high-frequency component information in the x-axis direction, low-frequency component information in the y-axis direction and high-frequency component information in the z-axis direction; a seventh target component includes high-frequency component information in the x-axis direction, high-frequency component information in the y-axis direction and low-frequency component information in the z-axis direction; and an eighth target component includes high-frequency component information in the x-axis direction, high-frequency component information in the y-axis direction and high-frequency component information in the z-axis direction.

Afterwards, the spatial frequency domain transform is performed based on a combination of the first target component and the second target component to acquire the global contour feature information; the spatial frequency domain transform is performed based on a combination of the third target component and the fourth target component to acquire the transversal detail feature information; the spatial frequency domain transform is performed based on a combination of the fifth target component and the sixth target component to acquire the longitudinal detail feature information; and the spatial frequency domain transform is performed based on a combination of the seventh target component and the eighth target component to acquire the diagonal detail feature information, thereby acquiring the complete raw feature information.

In the embodiment of the present application, when the image to be processed is a three-dimensional image, three transformations are respectively performed from three directions including the x axis, y axis and z axis to accurately acquire each frequency component, and then the frequency components are combined and transformed to acquire the corresponding global contour feature information, transversal detail feature information, longitudinal detail feature information and diagonal detail feature information, which can make the extraction of the raw feature information more complete and accurate.

At S103: input the raw feature information into a trained target network for processing to acquire corresponding reconstruction feature information; where the reconstruction feature information includes global contour reconstruction information, transversal detail reconstruction information, longitudinal detail reconstruction information and diagonal detail reconstruction information; the target network is a generator group acquired through training a first sample image and a corresponding second sample image based on four generative adversarial networks; resolution of the first sample image is higher than resolution of the second sample image.

Figure 4:
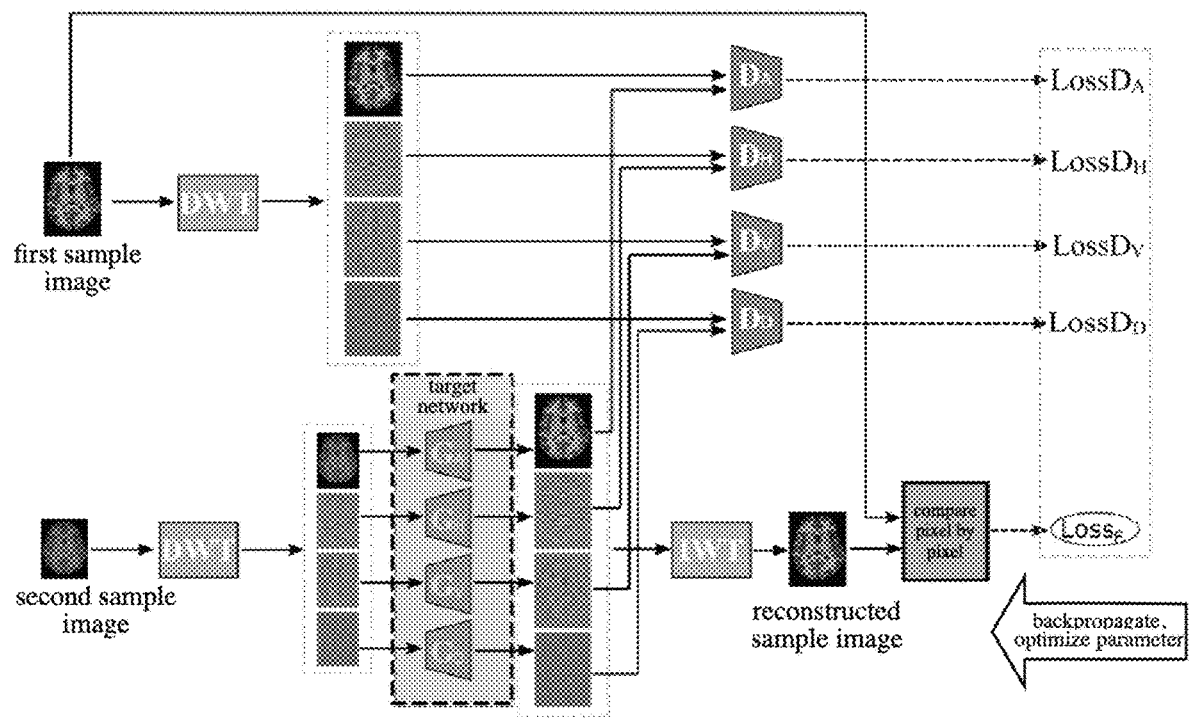
FIG. 4 is a schematic diagram of a system architecture of an image enhancement method provided by the present application.

As shown in FIG. 2, the raw feature information is input into the trained target network for processing to acquire the corresponding reconstruction feature information, and the reconstruction feature information includes the global contour reconstruction information, the transversal detail reconstruction information, the longitudinal detail reconstruction information and the diagonal detail reconstruction information, which respectively correspond to the four images from top to bottom in the reconstruction feature information of FIG. 2. Specifically, the target network is a generator group containing four generators. Specifically, in a system architecture as shown in FIG. 4, the target network is a generator group acquired through training the first sample image and the corresponding second sample image based on four generative adversarial networks; here the resolution of the first sample image is higher than the resolution of the second sample image. Specifically, the four generative adversarial networks are composed of a generator group and a discriminator group, the generator group includes a first generator $G_A$, a second generator $G_H$, a third generator $G_V$ and a fourth generator $G_D$, and the discriminator group includes a first discriminator $D_A$, a second discriminator $D_H$, a third discriminator $D_V$ and a fourth discriminator $D_D$; the first generator $G_A$ corresponds to the first discriminator $D_A$ to form a first generative adversarial network, the second generator $G_H$ corresponds to the second discriminator $D_H$ to form a second generative adversarial network, the third generator $G_V$ corresponds to the third discriminator $D_V$ to form a third generative adversarial network, and the fourth generator $G_D$ corresponds to the fourth discriminator $D_D$ to form a fourth generative adversarial network.

Further, the four generative adversarial networks are specifically four relative average generative adversarial networks. Since the relative average generative adversarial network, during training, constrains the discriminator and generator based on relative discriminant probability, and comprehensively considers relative authenticity probability between a real sample and generated data, so as to solve the problem of instability in the training process of the generative adversarial network, thereby achieving more accurate training, and making the extraction of detailed features by the final acquired target network more accurate.

Further, the trained target network includes a first generator, a second generator, a third generator and a fourth generator, and the step S103 includes:
  at S10301: inputting the global contour feature information into the first generator for processing to acquire the global contour reconstruction information;
  at S10302: inputting the transversal detail feature information into the second generator for processing to acquire the transversal detail reconstruction information;
  at S10303: input the longitudinal detail feature information into the third generator for processing to acquire the longitudinal detail reconstruction information;
  at S10304: inputting the diagonal detail feature information into the fourth generator for processing to acquire the diagonal detail reconstruction information.

In an embodiment of the present application, the target network specifically includes a first generator $G_A$, a second generator $G_H$, a third generator $G_V$ and a fourth generator $G_D$.

In the S10301, the global contour feature information in the raw feature information is specifically input into the first generator $G_A$ to learn and reconstruct the global contour features, so as to acquire the corresponding global contour reconstruction information.

In the S10302, the transversal detail feature information in the raw feature information is specifically input into the second generator $G_H$ to learn and reconstruct the transversal detail features, so as to acquire the corresponding transversal detail reconstruction information.

In the S10303, the longitudinal detail feature information in the raw feature information is specifically input into the third generator $G_V$ to learn and reconstruct the transversal detail features, so as to acquire the corresponding longitudinal detail reconstruction information.

In the S10304, the diagonal detail feature information in the raw feature information is specifically input into the fourth generator $G_D$ to learn and reconstruct the transversal detail features to acquire the corresponding diagonal detail reconstruction information.

It should be understood that the above steps from S10301 to S10304 are performed independently, and these four steps may be performed simultaneously or sequentially in any order. Further, these four steps are specifically performed at the same time, thereby improving the processing efficiency of the target network.

In the embodiments of the present application, the four generators of the target network respectively accurately reconstruct the four pieces of feature information to acquire the four pieces of reconstruction information, so that the target network extracts the detail features more accurately.

Further, the first generator, the second generator, the third generator and the fourth generator are all residual network structures including n residual blocks, where n is a positive integer; correspondingly, the inputting the raw feature information into the trained target network for processing to acquire the corresponding reconstruction feature information includes:
  at S10301A: inputting the global contour feature information into the first generator, and acquiring n first intermediate feature information through n first residual blocks; and acquiring the global contour reconstruction information according to the n first intermediate feature information;
  at S10302A: inputting the transversal detail feature information into the second generator, and acquiring n second intermediate feature information through n second residual blocks; and acquiring the transversal detail reconstruction information according to the n second intermediate feature information;
  at S10303A: inputting the longitudinal detail feature information into the third generator, and acquiring n third intermediate feature information through n third residual blocks; and acquiring the longitudinal detail reconstruction information according to the n third intermediate feature information;

at S10304A: inputting the diagonal detail feature information into the fourth generator, and acquiring n fourth intermediate feature information through n fourth residual blocks; and acquiring the diagonal detail reconstruction information according to the n fourth intermediate feature information.

Figure 5:
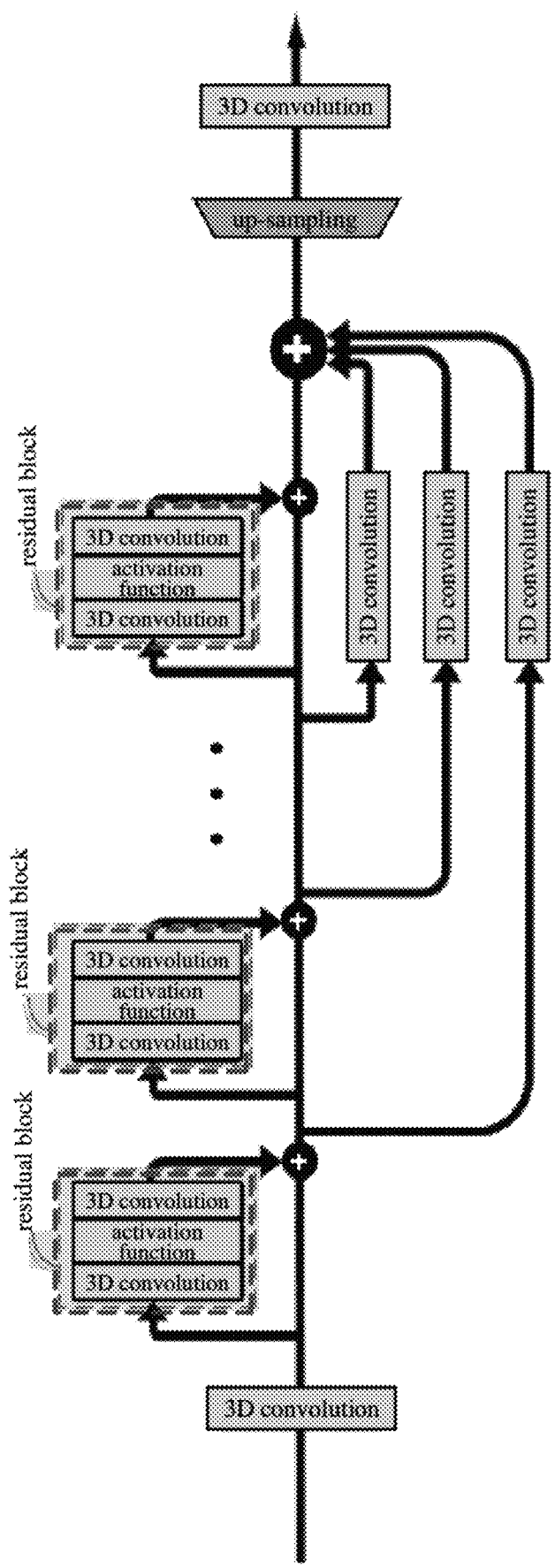
FIG. 5 is a schematic diagram of a network structure of a generator provided by the present application.

In the embodiments of the present application, each generator in the target network is a residual network structure including n residual blocks, where n is a positive integer. As shown in FIG. 5, the network structure of each generator specifically includes a first 3D convolutional layer, n residual blocks, (n−1) long connections (where each long connection contains a second 3D convolutional layer), an up-sampling layer and a third 3D convolutional layer. Among them, each residual block includes two 3D convolutional layers and an activation function between the two 3D convolutional layers.

Specifically, as an example, n is 20, the first 3D convolutional layer is a 9×9×9 convolutional layer, each residual block consists of a 3×3×3 convolutional layer, a Leaky ReLU activation function and a 3×3×3 convolutional layer, the second 3D convolutional layer is a 1×1×1 convolutional layer, and the third 3D convolutional layer is a 3×3×3 convolutional layer.

Specifically, the step S10301A is taken as an example, the details of which are as follows.

At S10301A1: input the global contour feature information into the first 3D convolution of the first generator to acquire a first feature vector.

At S10301A2: input the first feature vector into the n first residual blocks in sequence to acquire the n first intermediate feature information. Specifically, after data processing is performed on each residual block in the preceding (n−1) first residual blocks, the generated feature information is input into the next residual block for processing and at the same time is connected to the end of the last first residual block as intermediate feature information through one long connection including the second 3D convolutional layer; the information output by the last first residual block is also regarded as intermediate feature information, which combines other (n−1) pieces of intermediate feature information acquired through long connections to acquire n pieces of intermediate feature information for weighting processing, so as to acquire a second feature vector.

At S10301A3: input the second feature vector into the up-sampling layer for up-sampling processing to acquire a third feature vector.

At S10301A4: input the third feature vector into the last third 3D convolutional layer to acquire the global contour reconstruction information.

The processing processes of the generators in the steps from S10302A to S10304A for the detail feature information are similar to the processing process of the step S10301A, which will not be repeated herein again.

In the embodiments of the present application, since each generator is a residual network structure, the intermediate feature information may be directly connected to the last residual block through the long connection, so that the subsequent network layer can directly learn the previous intermediate feature information, and the problem of information loss and depletion when the feature information is transmitted through the convolutional layers is reduced, thereby improving the accuracy of feature extraction.

At S104: perform an inverse wavelet transform operation on the reconstruction feature information to acquire a reconstructed image; here resolution of the reconstructed image is higher than resolution of the image to be processed.

As shown in FIG. 2, the reconstruction feature information obtained through processing by the target network is input into an IWT (Inverse Wavelet Transformation) model to form the inverse wavelet transformation operation, the various pieces of detail feature information are synthesized and transformed to acquire the reconstructed image, and the resolution of the reconstructed image is higher than the resolution of the image to be processed. Since the global contour reconstruction information, the transversal detail reconstruction information, the longitudinal detail reconstruction information and the diagonal detail reconstruction feature information in the reconstruction feature information are information obtained through the respective accurate reconstruction by the trained target network, therefore loss of detailed feature information can be avoided, and the clarity and accuracy of the final synthesized reconstructed image can be improved.

In the embodiments of the present application, the raw feature information including the global contour feature information, transversal detail feature information, longitudinal detail feature information and diagonal detail feature information is obtained by performing the wavelet transform operation on the image to be processed, and the reconstruction feature information including the global contour reconstruction information, transversal detail reconstruction information, longitudinal detail reconstruction information and diagonal detail reconstruction information is acquired through the trained target network respectively, and then the inverse wavelet transform is performed on the reconstruction feature information to acquire the reconstructed image having a higher resolution than the resolution of the image to be processed. Since the target network is a generator group acquired through training the first sample image and the corresponding second sample image based on four generative adversarial networks, after the global contour feature information and the detailed feature information in all directions of the image to be processed are distinguished, the reconstruction feature information including the global contour reconstruction information, transversal detail reconstruction information, longitudinal detail reconstruction information and diagonal detail feature information can be generated correspondingly and accurately through the target network, and then the inverse wavelet transform is performed to make every detail information be reconstructed accurately and separately, therefore the final reconstructed image can be made clearer and more accurate.

Figure 6:
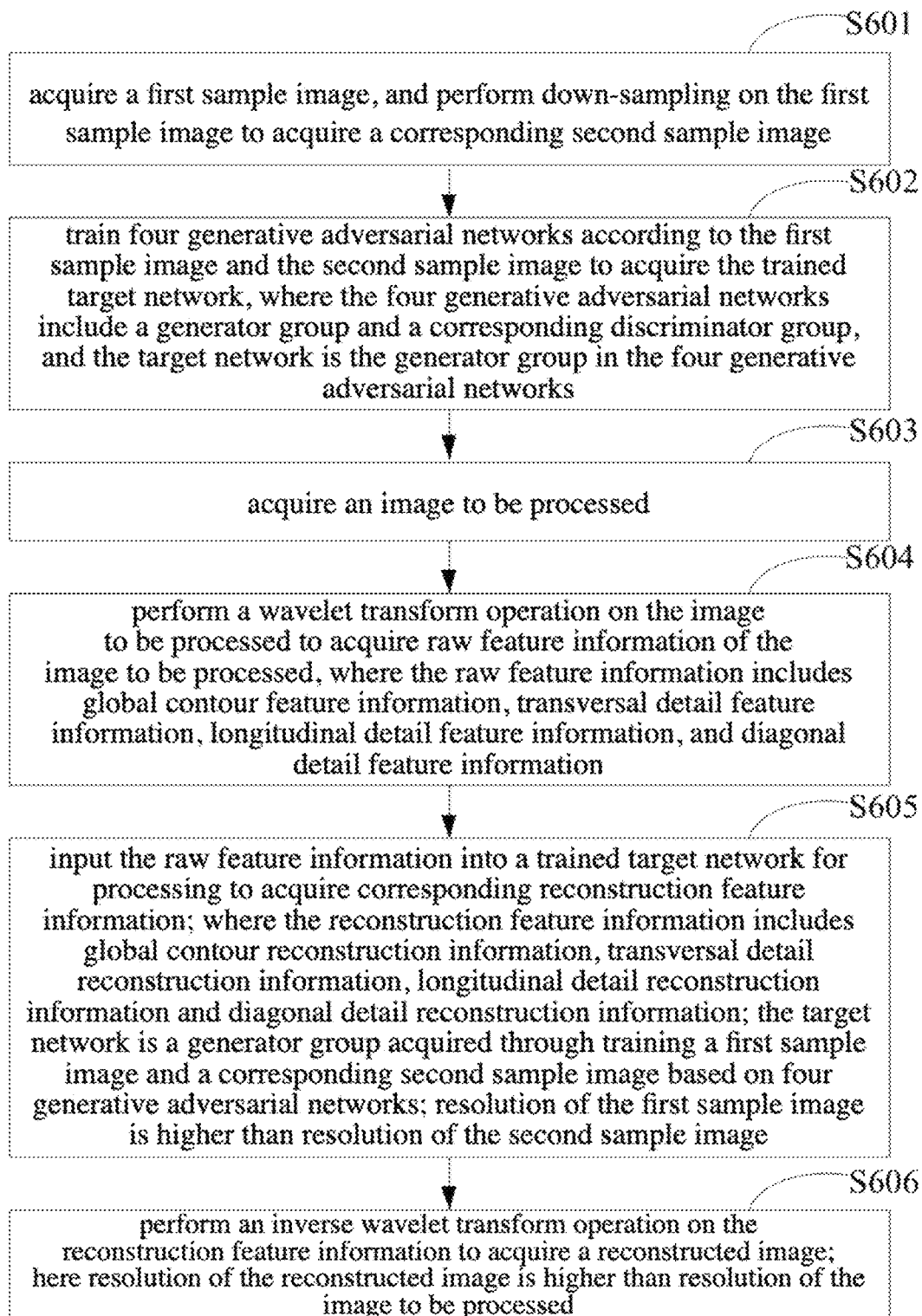
FIG. 6 is a schematic diagram of an implementation process of a second image enhancement method provided by the present application.

Please refer to FIG. 6, FIG. 6 is a schematic flowchart of a second image enhancement method provided by an embodiment of the present application. An execution subject of the image enhancement method in this embodiment is a terminal device, which includes but is not limited to a mobile terminal such as a smart phone, a tablet computer, and a PDA (Personal Digital Assistant) etc., and may also include a terminal device such as a desktop computer and a server etc.

This embodiment adds training steps from S601 to S602 of the target network on the basis of the previous embodiment, the steps from S603 to S606 in this embodiment are exactly the same as the steps from S101 to S104 in the previous embodiment, the details refer to the relevant description of the steps from S101 to S104 in the previous embodiment, which will not be repeated herein again. In the image enhancement method as shown in FIG. 6, in order to improve the accuracy of the reconstruction feature information acquired by the target network, the S601 and S602 are as follows.

At S601: acquire a first sample image, and perform down-sampling on the first sample image to acquire a corresponding second sample image.

The first sample image having a higher resolution is acquired, and a down-sampling operation is performed on the first sample image to acquire the corresponding second sample image having a lower resolution. Each first sample image corresponds to one second sample image acquired through down-sampling.

At S602: train four generative adversarial networks according to the first sample image and the second sample image to acquire the trained target network, where the four generative adversarial networks include a generator group and a corresponding discriminator group, and the target network is the generator group in the four generative adversarial networks.

As shown in FIG. 4, the four generative adversarial networks in an embodiment of the present application include the generator group and the discriminator group, the generator group includes a first generator $G_A$, a second generator $G_H$, a third generator $G_V$ and a fourth generator $G_D$, and the discriminator group includes a first discriminator $D_A$, a second discriminator $D_H$, a third discriminator $D_V$ and a fourth discriminator $D_D$; the first generator $G_A$ corresponds to the first discriminator $D_A$ to form the first generative adversarial network, the second generator $G_H$ corresponds to the second discriminator $D_H$ to form a second generative adversarial network, the third generator $G_V$ corresponds to the third discriminator $D_V$ to form the third generative adversarial network, and the fourth generator $G_D$ corresponds to the fourth discriminator $D_D$. The target network in the embodiment of the present application is specifically the generator group in the four generative adversarial networks.

The four generative adversarial networks are trained according to the first sample image having higher resolution and the second sample image having lower resolution and corresponding to the first sample image to acquire four trained generative adversarial networks. The generator group is acquired from the four trained generative adversarial networks to acquire the trained target network.

Further, the step S602 includes:

at S60201: performing wavelet transformation on the first sample image to acquire first raw feature information of the first sample image, where the first raw feature information includes first global contour feature information, first transversal detail feature information, first longitudinal detail feature information and first diagonal detail feature information;

at S60202: performing wavelet transform on the second sample image to acquire second raw feature information of the second sample image, where the second raw feature information includes second global contour feature information, second transversal detail feature information, second longitudinal detail feature information and second diagonal detail feature information;

at S60203: inputting the second raw feature information into the generator group for processing to acquire corresponding sample data reconstruction information, where the sample data reconstruction information includes global sample contour reconstruction information, transversal sample detail reconstruction information, longitudinal sample detail reconstruction information and diagonal sample detail reconstruction information;

at S60204: inputting the first raw feature information and the sample data reconstruction information into the discriminator group for processing to acquire a corresponding discrimination output result;

at S60205: calculating loss values of the discriminators in the discriminator group and loss values of the generators in the generator group according to the discrimination output result;

at S60206: iteratively updating network parameters of the discriminators and the generators through a gradient descent backpropagation algorithm respectively according to each of the loss values of the discriminators and each of the loss values of the generators, and minimizing each of the loss values of the discriminators and each of the loss values of the generators to acquire the trained target network.

In the S60201, the first sample image is input into the DWT (Discrete Wavelet Transform) model to perform wavelet transform and transform into the spatial frequency domain so as to acquire the first raw feature information of the first sample image, and the first raw feature information includes the first global contour feature information, the first transversal detail feature information, the first longitudinal detail feature information and the first diagonal detail feature information that are four pieces of feature information through extraction.

In the S60202, the second sample image is input into the DWT (Discrete Wavelet Transform) model to perform the wavelet transform and transform into the spatial frequency domain so as to acquire the second raw feature information of the second sample image, and the second raw feature information includes the second global contour feature information, the second transversal detail feature information, the second longitudinal detail feature information and the second diagonal detail feature information that are four pieces of feature information through extraction.

In the S60203, the second raw feature information is input into the generator group for processing to acquire the corresponding sample data reconstruction information. Specifically, the second global contour feature information in the second raw feature information is input into the first generator in the generator group for processing to acquire the global sample contour reconstruction information in the sample data reconstruction information; the second transversal detail feature information is input into the second generator in the generator group for processing to acquire the corresponding transversal sample detail reconstruction information; the second longitudinal detail feature information is input into the third generator in the generator group for processing to acquire the corresponding longitudinal sample detail reconstruction information; and the second diagonal detail feature information is input into the fourth generator for processing to acquire the corresponding diagonal sample detail reconstruction information.

In the S60204, specifically, the first global contour feature information in the first raw feature information and the global sample contour reconstruction information yA in the sample data reconstruction information are input into the first discriminator in the discriminator group for processing to acquire the discrimination output result of the first discriminator; the first transversal detail feature information in the first raw feature information and the transversal sample detail reconstruction information in the sample data reconstruction information are input into the second discriminator in the discriminator group for processing to acquire the discrimination output result of the second discriminator; the first longitudinal detail feature information in the first raw feature information and the longitudinal sample detail reconstruction information in the sample data reconstruction information are input into the third discriminator in the discriminator group for processing to acquire the third discrimination output result; and the first diagonal detail feature information in the first raw feature information and the diagonal sample detail reconstruction information in the sample data reconstruction information are input into the fourth discriminator in the discriminator group for processing to acquire the fourth discrimination output result.

In the S60205, the corresponding loss values of the discriminators (which specifically includes the loss value $LossD_A$ of the first discriminator, the loss value $LossD_H$ of the second discriminator, the loss value $LossD_V$ of the third discriminator and the loss value $LossD_D$ of the fourth discriminator) are calculated according to the discrimination output results and preset formulas for calculating the loss values of the discriminators. According to the discrimination output results and the preset formulas for calculating the loss values of the generators, the loss values of the generators acquired through calculation specifically includes the loss value $LossG_A$ of the first generator, the loss value $LossG_H$ of the second generator, the loss value $LossG_V$ of the third generator, and the loss value $LossG_D$ of the fourth generator.

Further, the four generative adversarial networks in the embodiment of the present application are all relative mean generative adversarial networks, in the relative mean generative adversarial network, calculation formulas of its loss value $Loss_D$ of the discriminator and its loss value $Loss_G$ of the generator are calculated as follows:

$$[2] LossD = -E_{x_r \sim P}[\log(D(x_r, x_f))] - E_{x_f \sim Q}[\log(1 - (x_f, x_r))] \quad (1)$$

$$[3] LossG = -E_{x_r \sim P}[\log(1 - D(x_r, x_f))] - E_{x_f \sim Q}[\log(D(x_f, x_r))] \quad (1)$$

where, $x_r$ represents real data directly input into the discriminator, and $x_f$ data represents generated data input into the discriminator after generated by the generator; $D(x_r, x_f) = $ sigmoid $(C(x_r) - E[C(x_f)])$, $C(x_r)$ represents probability that the discriminator discriminates the real data $x_r$ as true, and $C(x_f)$ represents probability that the discriminator discriminates the generated data $x_f$ as true.

According to the discrimination output results, based on the formula (1), the discriminator loss values corresponding to the discriminators can be calculated. specifically:

Regarding the loss value $LossD_A$ of the first discriminator, let $x_r$ in the formula (1) be specifically the first global contour feature information $y_A$ of the first sample image, let $x_f$ in the formula be specifically the global sample contour reconstruction information $x_A$ generated by the first generator, and $D_A(y_A, x_A)$ is determined according to the output result of the first discriminator, to acquire $LossD_A = -E_{y_A \sim P}[\log(1 - D_A(y_A, x_A))] - E_{x_A \sim Q}[\log(1 - D_A(x_A, y_A))]$; similarly, regarding the loss value $LossG_A$ of the first generator, according to the formula (2), there is: $LossG_A = -E_{y_A \sim P}[\text{Log}(1 - D_A(y_A, x_A))] - E_{x_A \sim Q}[\text{Log}(D(x_A, y_A))]$.

Regarding the loss value $LossD_H$ of the second discriminator, let $x_r$ in the formula (1) be specifically the first transversal detail feature information $y_H$ of the first sample image, let $x_f$ in the formula be specifically the transversal sample detail reconstruction information $x_H$ generated by the second generator, and $D_H(y_H, x_H)$ is determined according to the output result of the second discriminator, to acquire $LossD_H = -E_{y_H \sim P}[\log(D_H(y_H, x_H))] - E_{x_H \sim Q}[\log(1 - D_H(x_H, y_H))]$; similarly, regarding the loss value $LossG_H$ of the second generator, according to the formula (2), there is: $LossG_H = -E_{y_H \sim P}[\log(1 - D_H(y_H, x_H))] - E_{x_H \sim Q}[\log(D(x_H, y_H))]$.

Regarding the loss value $LossD_V$ of the third discriminator, let $x_r$ in the formula (1) be specifically the first longitudinal detail feature information $y_V$ of the first sample image, let $x_f$ in the formula be specifically the longitudinal sample detail reconstruction information $xx$ generated by the third generator, and $D_V(y_V, x_V)$ is determined according to the output result of the third discriminator, to acquire $LossD_V = -E_{y_V \sim P}[\log(D_V(y_H, x_H))] - E_{x_V \sim Q}[\log(1 - D_V(x_V, y_r))]$; similarly, regarding the loss value $LossG_V$ of the third generator, according to the formula (2), there is: $LossG_V = -E_{y_V \sim P}[\log(1 - D_V(y_V, x_V))] - E_{x_V \sim Q}[\log(D(x_V, y_V))]$.

Regarding the loss value $LossD_D$ of the fourth discriminator, let $x_r$ in the formula (1) be specifically the first transversal detail feature information $y_D$ of the first sample image, let $x_f$ in the formula be specifically the transversal sample detail reconstruction information $x_D$ generated by the fourth generator, and $D_D(y_D, x_D)$ is determined according to the output result of the fourth discriminator, to acquire $LossD_D = -E_{y_D \sim P}[\log(D_D(y_D, x_D))] - E_{x_D \sim Q}[\log(1 - D_D(x_D, y_D))]$; similarly, regarding the loss value $LossG_D$ of the fourth generator, according to the formula (2), there is: $LossG_D = -E_{y_D \sim P}[\log(1 - D_V(y_D, x_D))] - E_{x_D \sim Q}[\log(D(x_D, y_D))]$.

In the embodiments of the present application, since the relative mean generative adversarial network constrains the discriminators and generators during training based on the relative discrimination probability, comprehensively considers the probability of the relative authenticity between the real sample and the generated data, so as to solve the problem of instable training process of the generative adversarial network, thereby achieving more accurate training and making the extraction of the detail features by the final acquired target network more accurate.

In the S60206, according to the loss values of the discriminators and the loss values of the generators calculated in the step S60205, the gradient descent algorithm is used to calculate the parameter values of the discriminators and the generators required to be adjusted, and the respective network parameters of the discriminators and the generators are iteratively updated through back propagation, the loss values of the discriminators and the loss values of the generators are minimized to acquire the four trained generative adversarial networks, and the trained generator group is acquired therein as the trained target network. Specifically, each generative adversarial network is independently trained, and the trained generative adversarial network is obtained when all the four generative adversarial networks complete the training. Specifically, when each generative adversarial network is trained, the network parameters of the generators are fixed first, the loss values of the discriminators are minimized, the network parameters of the discriminators are updated by backpropagation, to complete the training of the discriminators; afterward, the network parameters of the discriminators are fixed, the loss values of the generators are minimized, the network parameters of the generators are updated through backpropagation, to complete the training of the generators, thereby completing the training of the generative adversarial network.

Further, after the step S60203, the method further includes:

at S602031: performing an inverse wavelet transform operation on the sample data reconstruction information to acquire a reconstructed sample image;

at S602032: comparing the reconstructed sample image with the corresponding first sample image pixel by pixel, and calculating pixel-by-pixel difference loss values;

correspondingly, the step S60206 specifically includes:

at S60206A: according to the loss values of the discriminators, the loss values of the generators, and the pixel-by-pixel difference loss values, iteratively updating the network parameters of the discriminators and the generators through a gradient descent backpropagation algorithm respectively, and minimizing the loss values of the discriminators, the loss values of the generators and the pixel-by-pixel difference loss values to acquire the trained target network.

In the embodiments of the present application, when the target network is trained based on the four generative adversarial networks, in addition to minimizing the loss values of the discriminators and the loss values of the generators, the pixel-by-pixel difference loss values, calculated by comparing the reconstructed sample image with the corresponding first sample image pixel by pixel, is added on this basis, and the pixel-by-pixel difference loss values are further minimized to further improve the accuracy of the trained target network.

Specifically, in the S602031, the inverse wavelet transform is performed according to the global sample contour reconstruction information, the transversal sample detail reconstruction information, the longitudinal sample detail reconstruction information, and the diagonal sample detail reconstruction information in the sample data reconstruction information, to synthesize the reconstructed sample image.

In the S602032, the reconstructed sample image and the corresponding first sample image (that is, the first sample image corresponding to the second sample image before reconstruction) are input into a pixel-by-pixel comparison module, and each pixel information in the two images is compared one by one, and the pixel-by-pixel difference loss value LossF is calculated. Among them, LossF=$E_{x \in X, y \in Y}[\|y-G(x)\|_1]$, y represents the real first sample image having higher resolution, G(x) represents the reconstructed sample image generated by the generator, and $\| \|_1$ represents the L1 paradigm, here the use of the L1 paradigm is useful to make the edges of the generated image clearer.

In the S60206A, specifically, when each generative adversarial network is trained, the network parameters of the generators are fixed first, the loss values of the discriminators are minimized, the network parameters of the discriminators are updated by backpropagation to complete the training of the discriminators; then the network parameters of the generators are fixed, the loss values of the generators are minimized, and the network parameters of the generators are updated through backpropagation; afterward, the pixel-by-pixel difference loss value LossF is minimized, and the network parameters of the generators and the discriminators are further updated through backpropagation, thereby completing the training of the generative adversarial network. After the training of each generative adversarial network is completed, the four trained generative adversarial networks are obtained. The four generators of the four generative adversarial networks are extracted to acquire the generator group as the trained target network.

Further, after the S60205, the method further includes:

at S602051: acquiring a loss value of the generative adversarial network according to the discrimination loss function corresponding to each of the discriminators and a global contour weight, a texture detail weight, a transversal detail weight, a longitudinal detail weight and a diagonal detail weight;

at S602052: calculating a total loss value according to the loss value of the generative adversarial network, the pixel-by-pixel difference loss value, a loss weight of the generative adversarial network and a pixel-by-pixel difference loss weight;

correspondingly, the S60206 specifically includes:

at S60206B: iteratively updating the respective network parameters of the discriminators and the discriminators through the gradient descent backpropagation algorithm according to the loss values of the discriminators, the loss values of the generators, the pixel-by-pixel difference loss values, and the total loss value, and minimizing the loss values of the discriminators, the loss values of the generators, the pixel-by-pixel difference loss values and the total loss value to acquire the trained target network.

Specifically, in the S602051, the the loss value LossGAN of the generative adversarial network is calculated according to the loss value $LossD_A$ of the first discriminator, the loss value $LossD_H$ of the second discriminator, the loss value $LossD_V$ of the third discriminator and the loss value $LossD_D$ of the fourth discriminator calculated in step S60205, and the global contour weight $\alpha_1$, the texture detail weight $\alpha_2$, the transversal detail weight $\beta_1$, the longitudinal detail weight $\beta_2$, the diagonal detail weight $\beta_3$ and the formula LossGAN=$\alpha_1 LossD_A + \alpha_2(\beta_1 LossD_H + \beta_2 LossD_V + \beta_3 LossD_D)$. Among them, the global contour weight $\alpha_1$, the texture detail weight $\alpha_2$, the transversal detail weight $\beta_1$, the longitudinal detail weight $\beta_2$ and the diagonal detail weight $\beta_3$ are all hyperparameters acquired through adjustment in advance according to the peak signal noise ranting (psnr) of the image. In the embodiments of the present application, the global contour weight $\alpha_1$ and the texture detail weight $\alpha_2$ are introduced to balance the weight between the global contour feature information and the texture detail feature information, so as to adjust the global contour and detail texture in the reconstructed image; the transversal detail weight $\beta_1$, the longitudinal detail weight $\beta_2$ and the diagonal detail weight $\beta_3$ are introduced to adjust the ratio of the transversal, longitudinal and diagonal detail feature information in the image, so as to realize the enhancement processing for the image.

Specifically, in the S602052, the total loss value $Loss_{total}$ is calculated by the formula $Loss_{total}=\lambda_1 LossGAN + \lambda_2 LossF$ according to the loss value LossGAN of the generative adversarial network, the pixel-by-pixel difference loss value LossF, the loss weight $\lambda_1$ of the generative adversarial network, and the pixel-by-pixel difference loss weight $\lambda_2$. Among them, the loss weight $\lambda_1$ of the generative adversarial network, and the pixel-by-pixel difference loss weight $\lambda_2$ are hyperparameters acquired through adjustment in advance according to the psnr of the image.

Specifically, in the S60206B, when each generative adversarial network is trained, the network parameters of the generators are fixed first, the loss values of the discriminators are minimized, and the network parameters of the discriminators are updated through backpropagation to complete the training of the discriminators; then the network parameters of the discriminators are fixed, the loss values of the generators are minimized, and the network parameters of the generators are updated through backpropagation; afterward, the pixel-by-pixel difference loss value LossF is minimized, and the network parameters of the generators and the discriminators are further updated through backpropagation; finally, the total loss value $Loss_{total}$ is minimized, and the network parameters of the generators and the discriminators are further updated through backpropagation to complete the training of the generative adversarial network. After the training of each generative adversarial network is completed, the four trained generative adversarial networks are acquired. The four generators of the four generative adversarial networks are extracted to acquire the generator group as the trained target network.

In the embodiments of the present application, the total loss value is obtained through the loss values and the weights of the discriminators, so that the network parameters of the generators in the target network are adjusted through the weights, the generators can generate global contour reconstruction information and the detail reconstruction information that are provided with a preset proportion, and the contour features and the detail features in the finally obtained reconstructed image can be accurately presented as expected, thereby improving the accuracy of the reconstructed image.

In the embodiments of the present application, the four generative adversarial networks are used to learn the distribution of the overall contour, transversal detail, longitudinal detail and diagonal texture detail of the first sample image (having higher resolution) in the wavelet spatial frequency domain, so that each of the generators in the trained target network can focus on the generation of the global contour feature information and the detail feature information in each direction of the image, thereby the reconstructed image having higher resolution and clear details can be synthesized through the inverse wavelet transform based on the accurate and complete feature information, and the problem that the high-resolution image obtained by converting from the low-resolution image is fuzzy is solved.

Further, the image enhancement method in the embodiments of the present application is applied to image enhancement for medical images, correspondingly, the first sample image is high-resolution medical image sample data.

During clinical diagnosis, medical imaging features of a patient are main basis for a clinician to make an accurate diagnosis. Therefore, when pathological medical imaging is performed on the patient, acquisition of high-resolution medical images having clearer pathological details helps the clinician perform more accurate analysis and more accurate diagnosis of the patient's condition. However, in basic medical institutions such as community hospitals, their equipment only supports low-resolution general medical imaging, and does not support high-resolution medical image scanning. Moreover, the acquisition of high-resolution medical images through CT (Computed Tomography) requires the use of high-dose contrast agent, but the use of high-dose contrast agent brings other potential risks to the patient, such as inducing renal failure and bradycardia etc. Regarding MRI (Magnetic Resonance Imaging), it takes a long scan time (about 30 minutes) to obtain high-resolution images, during which the patient needs to remain still, and it is likely to cause problems such as ghosting and blurring of the imaging results if displacement occurs. At the same time, long scanning time also causes heavier labor and larger time cost to the doctor, ultimately increasing the medical costs of the patient. To sum up, in the field of medical imaging, low-resolution medical images are usually collected first, and then the collected low-resolution medical images are converted into high-resolution medical images to assist in medical diagnosis. In order to better assist medical diagnosis, it is necessary to solve the problem of how to accurately convert low-resolution medical images into clear high-resolution medical images.

In the embodiments of the present application, the steps of the above-mentioned image enhancement method are specifically applied to the image enhancement of medical images to solve the above-mentioned problems. Specifically, the collected low-resolution medical image is used as the image to be processed, and the reconstructed image obtained through the processing of the steps of the image enhancement method is the high-resolution medical image. Correspondingly, when the target network is trained based on the four generative adversarial networks, the high-resolution medical image sample data is specifically used as the first sample image, and the low-resolution medical image sample data acquired through performing down-sampling on the high-resolution medical image sample data is used as the second sample image to train the target network, so that the final trained target network can accurately learn the feature information of the high-resolution medical image sample data, thereby making the reconstructed image obtained by the inverse wavelet transform is the accurate high-resolution medical image having clear details. Further, the embodiments of the present application can also determine weight parameters such as the global contour weight $\alpha_1$, the texture detail weight $\alpha_2$, the weight to balance between the global contour feature information and the texture detail feature information, the transversal detail weight Pi, the longitudinal detail weight $\beta_2$, the diagonal detail weight $\beta_3$ etc. according to the area position of the lesion required to be analyzed in the medical image, so as to enhance the detail information of the lesion in medical image.

Figure 7:
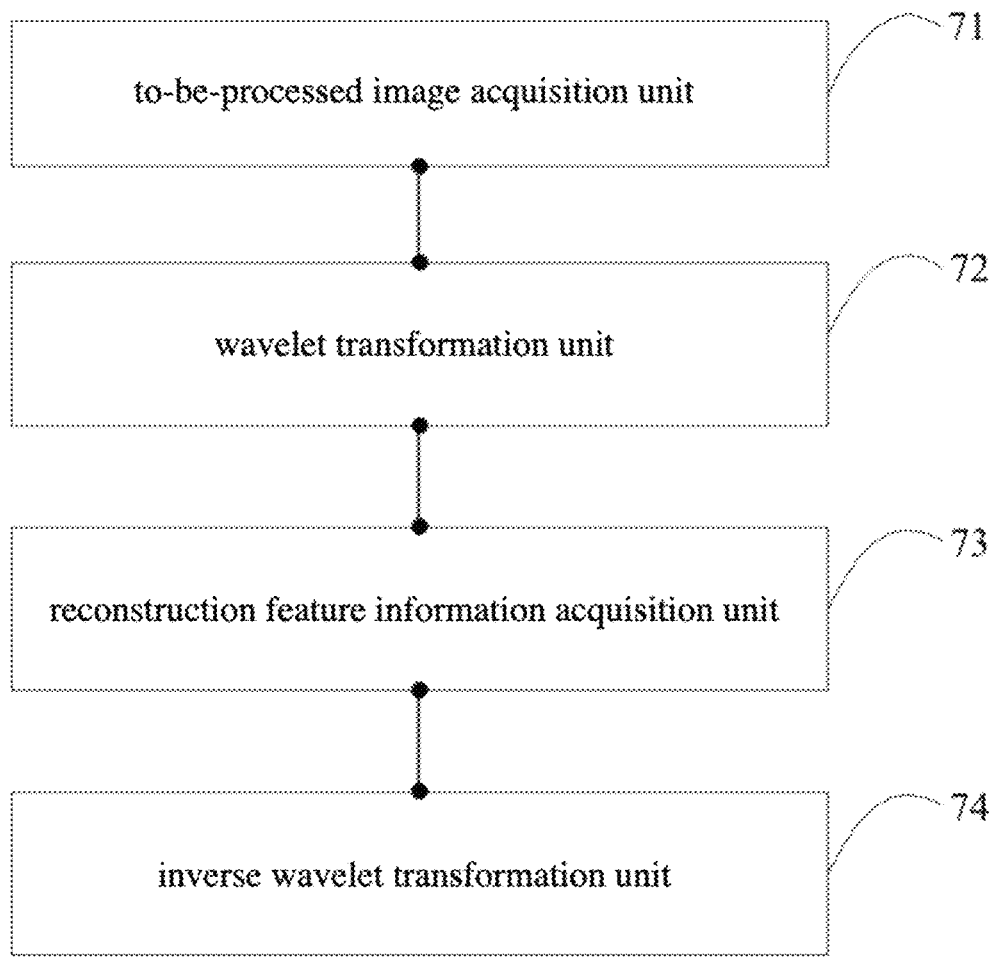
FIG. 7 is a schematic diagram of an image enhancement apparatus provided by the present application.

An embodiment of the present application further provides an image enhancement apparatus, as shown in FIG. 7, only the parts related to the embodiment of the present application are shown for ease of description.

This image apparatus includes: a to-be-processed image acquisition unit 71, a wavelet transformation unit 72, a reconstruction feature information acquisition unit 73, and an inverse wavelet transformation unit 74.

The to-be-processed image acquisition unit 71 is configured to acquire an image to be processed.

The wavelet transform unit 72 is configured to perform a wavelet transform operation on the image to be processed to acquire raw feature information of the image to be processed, where the raw feature information includes global contour feature information, transversal detail feature information, longitudinal detail feature information, and diagonal detail feature information.

Further, the wavelet transform operation is specifically a symmetrical compactly supported orthogonal wavelet transform operation.

Further, the four generative adversarial networks are specifically four relative average generative adversarial networks.

The reconstruction feature information acquisition unit 73 is configured to input the raw feature information into a trained target network for processing to acquire corresponding reconstruction feature information; where the reconstruction feature information includes global contour reconstruction information, transversal detail reconstruction information, longitudinal detail reconstruction information and diagonal detail reconstruction information; the target network is a generator group acquired through training a first sample image and a corresponding second sample image based on four generative adversarial networks; resolution of the first sample image is higher than resolution of the second sample image.

The inverse wavelet transform unit 74 is configured to perform an inverse wavelet transform operation on the reconstruction feature information to acquire a reconstructed image; here resolution of the reconstructed image is higher than resolution of the image to be processed.

Further, the wavelet transform unit includes:
a first wavelet transform module configured to perform a wavelet transform operation on the image to be processed in an x-axis direction to acquire first spectrum information;
a second wavelet transform module configured to perform a wavelet transform operation on the first spectrum information in a y-axis direction to acquire second spectrum information;
a third wavelet transform module configured to perform a wavelet transform operation on the second spectrum information in a z-axis direction to acquire third spectrum information;
a raw feature information acquisition module configured to acquire the raw feature information according to the third spectrum information.

Further, the trained target network includes a first generator, a second generator, a third generator and a fourth generator, and the reconstruction feature information acquisition unit includes:
a global contour reconstruction information acquisition module configured to input the global contour feature information into the first generator for processing to acquire the global contour reconstruction information;
a transversal detail reconstruction information acquisition module configured to input the transversal detail feature information into the second generator for processing to acquire the transversal detail reconstruction information;
a longitudinal detail reconstruction information acquisition module configured to input the longitudinal detail feature information into the third generator for processing to acquire the longitudinal detail reconstruction information;
a diagonal detail reconstruction information acquisition module configured to input the diagonal detail feature information into the fourth generator for processing to acquire the diagonal detail reconstruction information.

Further, the global contour reconstruction information acquisition module is specifically configured to: input the global contour feature information into the first generator and acquire n first intermediate feature information through n first residual blocks; and acquire the global contour reconstruction information according to the n first intermediate feature information;
the transversal detail reconstruction information acquisition module is specifically configured to: input the transversal detail feature information into the second generator and acquire n second intermediate feature information through n second residual blocks; and acquire the transversal detail reconstruction information according to the n second intermediate feature information;
the longitudinal detail reconstruction information acquisition module is specifically configured to: input the longitudinal detail feature information into the third generator, and acquire n third intermediate feature information through n third residual blocks; and acquire the longitudinal detail reconstruction information according to the n third intermediate feature information;
the diagonal detail reconstruction information acquisition module is specifically configured to: input the diagonal detail feature information into the fourth generator and acquire n fourth intermediate feature information through n fourth residual blocks; and acquire the diagonal detail reconstruction information according to the n fourth intermediate feature information.

Further, the image enhancement apparatus further includes:
a sample image acquisition unit configured to acquire a first sample image and perform down-sampling on the first sample image to acquire a corresponding second sample image;
a training unit configured to train four generative adversarial networks according to the first sample image and the second sample image to acquire the trained target network, where the four generative adversarial networks include a generator group and a corresponding discriminator group, and the target network is the generator group in the four generative adversarial networks.

Further, the training unit includes:
a first wavelet transform module configured to perform wavelet transformation on the first sample image to acquire first raw feature information of the first sample image, where the first raw feature information includes first global contour feature information, first transversal detail feature information, first longitudinal detail feature information and first diagonal detail feature information;
a second wavelet transform module configured to perform wavelet transform on the second sample image to acquire second raw feature information of the second sample image, where the second raw feature information includes second global contour feature information, second transversal detail feature information, second longitudinal detail feature information and second diagonal detail feature information;
a sample data reconstruction information acquisition module configured to input the second raw feature information into the generator group for processing to acquire corresponding sample data reconstruction information, where the sample data reconstruction information includes global sample contour reconstruction information, transversal sample detail reconstruction information, longitudinal sample detail reconstruction information and diagonal sample detail reconstruction information;
a discrimination module configured to input the first raw feature information and the sample data reconstruction information into the discriminator group for processing to acquire a corresponding discrimination output result;
a first calculation module configured to calculate loss values of the discriminators in the discriminator group and loss values of the generators in the generator group according to the discrimination output result;
a training module configured to: iteratively update network parameters of the discriminators and the generators through a gradient descent backpropagation algorithm respectively according to each of the loss values of the discriminators and each of the loss values of the generators, and minimize each of the loss values of the discriminators and each of the loss values of the generators to acquire the trained target network.

Further, the training unit further includes:
a sample reconstruction image acquisition module configured to perform an inverse wavelet transform operation on the sample data reconstruction information to acquire a reconstructed sample image;
a second calculation module configured to: compare the reconstructed sample image with the corresponding first sample image pixel by pixel, and calculate a pixel-by-pixel difference loss value;

correspondingly, the training module is specifically configured to: iteratively update the network parameters of the discriminators and the generators through the gradient descent backpropagation algorithm respectively according to each of the loss values of the discriminators, each of the loss values of the generators and the pixel-by-pixel difference loss value, and minimize each of the loss values of the discriminators, each of the loss values of the generators and the pixel-by-pixel difference loss value to acquire the trained target network.

Further, the training unit further includes:

a third calculation module configured to acquire a loss value of the generative adversarial network according to a discrimination loss value corresponding to each of the discriminators, a global contour weight, a texture detail weight, a transversal detail weight, a longitudinal detail weight and a diagonal detail weight;

a fourth calculation module configured to calculate a total loss value according to the loss value of the generative adversarial network, the pixel-by-pixel difference loss value, a loss weight of the generative adversarial network and a pixel-by-pixel difference loss weight;

correspondingly, the training module is specifically configured to: iteratively update the network parameters of the discriminators and the discriminators through the gradient descent backpropagation algorithm respectively according to each of the loss values of the discriminators, each of the loss values of the generators, the pixel-by-pixel difference loss value and the total loss value, and minimize each of the loss values of the discriminators, each of the loss values of the generators, the pixel-by-pixel difference loss value and the total loss value to acquire the trained target network.

Further, the image enhancement apparatus is applied to image enhancement of three-dimensional medical images, and correspondingly the first sample image is high-resolution three-dimensional medical image sample data.

Figure 8:
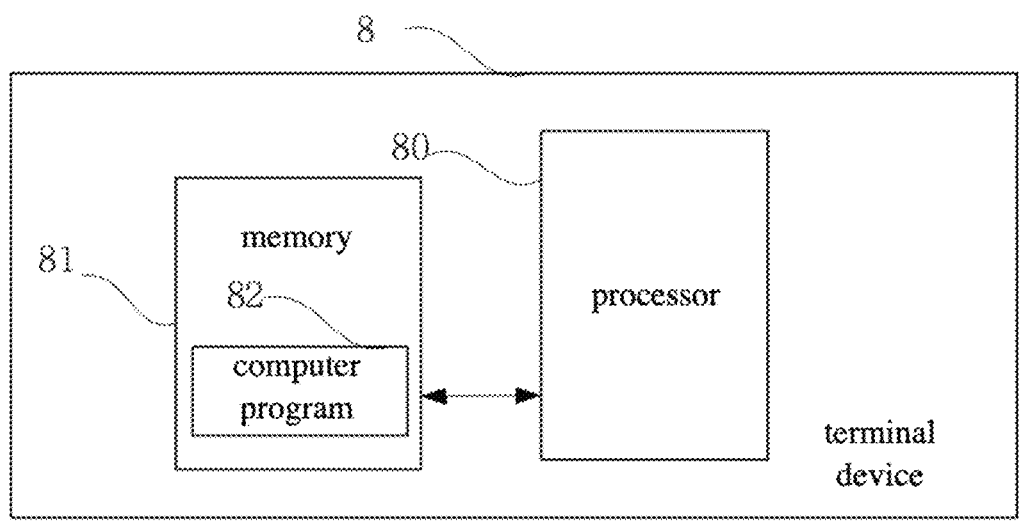
FIG. 8 is a schematic structural diagram of an embodiment of a terminal device provided by the present application.

Please refer to FIG. 8, FIG. 8 is a schematic diagram of a terminal device provided by another embodiment of the present application. As shown in FIG. 8, the terminal device of this embodiment includes: a processor 80, a memory 81, and a computer program 82 stored in the memory 81 and executable on the processor 80. When the processor 80 executes the computer program 82, the above-mentioned steps of in the embodiments of the image enhancement method are implemented by the terminal device, for example, S101 to S104 as shown in FIG. 1. Alternatively, when the processor 80 executes the computer program 82, the functions of the units in the foregoing embodiments are implemented, for example, the functions of the units from 71 to 74 as shown in FIG. 7.

Exemplarily, the computer program 82 may be divided into one or more units, and the one or more units are stored in the memory 81 and executed by the processor 80 to complete the present application. The one or more units may be a series of computer program segments capable of completing specific functions, and the program segments are used to describe the execution process of the computer program 82 in the terminal device 8. For example, the computer program 82 may be divided into an acquisition unit, a preprocessing unit and a classification unit, and the specific functions of the units are as described above. The terminal device may include, but is not limited to, the processor 80 and the memory 81. Those skilled in the art should understand that FIG. 7 is only an example of the terminal device 8 and does not constitute a limitation on the terminal device 8, which may include more or less components than those as shown in the figure, or combine certain components, or include different components, for example, the terminal device may further include an input and output terminal device, a network access terminal device, a bus, and the like.

The so-called processor 80 may be a CPU (Central Processing Unit), and may also be other general-purpose processor, DSP (Digital Signal Processor), ASIC (Application Specific Integrated Circuit), FPGA (Field-Programmable Gate Array), or other programmable logic device, discrete gate or transistor logic device, discrete hardware component, etc. The general-purpose processor may be a microprocessor or the processor may also be any conventional processor or the like. The memory 81 may be an internal storage unit of the terminal device 8, such as a hard disk or storage of the terminal device 8. The memory 81 may also be an external storage terminal device of the terminal device 8, such as a plug-in hard disk, a SMC (Smart Media Card), a SD (Secure Digital) card, a flash card etc. equipped on the terminal device 8. Further, the memory 81 may also include both an internal storage unit of the terminal device 8 and an external storage terminal device. The memory 81 is used to store the computer program and other programs and data required by the terminal device. The memory 81 may also be used to temporarily store data that has been output or will be output. The above-mentioned embodiments are only used to illustrate, but not to limit, the technical solutions of the present application; although the present application has been described in detail with reference to the foregoing embodiments, those of ordinary skill in the art should understand that: they can still modify the technical solutions recited in the foregoing embodiments, or equivalently replaces some of the technical features therein; and these modifications or replacements do not cause the essence of the corresponding technical solutions to deviate from the spirit and scope of the technical solutions of the embodiments of the present application, and should be included within the protection scope of the present application.

What is claimed is:

1. An image enhancement method, comprising:
acquiring an image to be processed;
performing a wavelet transform operation on the image to be processed to acquire raw feature information of the image to be processed, wherein the raw feature information includes global contour feature information, transversal detail feature information, longitudinal detail feature information, and diagonal detail feature information;
inputting the raw feature information into a trained target network for processing to acquire corresponding reconstruction feature information; wherein the reconstruction feature information includes global contour reconstruction information, transversal detail reconstruction information, longitudinal detail reconstruction information and diagonal detail reconstruction information, the target network is a generator group acquired through training a first sample image and a corresponding second sample image based on four generative adversarial networks, and resolution of the first sample image is higher than resolution of the second sample image;
performing an inverse wavelet transform operation on the reconstruction feature information to acquire a reconstructed image; wherein resolution of the reconstructed image is higher than resolution of the image to be processed;

wherein the trained target network comprises a first generator, a second generator, a third generator and a fourth generator, and the inputting the raw feature information into a trained target network for processing to acquire corresponding reconstruction feature information comprises:

inputting the global contour feature information into the first generator for processing to acquire the global contour reconstruction information;

inputting the transversal detail feature information into the second generator for processing to acquire the transversal detail reconstruction information;

inputting the longitudinal detail feature information into the third generator for processing to acquire the longitudinal detail reconstruction information;

inputting the diagonal detail feature information into the fourth generator for processing to acquire the diagonal detail reconstruction information;

wherein the first generator, the second generator, the third generator and the fourth generator are all residual network structures including n residual blocks, wherein n is a positive integer;

correspondingly, the inputting the raw feature information into a trained target network for processing to acquire corresponding reconstruction feature information comprises:

inputting the global contour feature information into the first generator and acquiring n first intermediate feature information through n first residual blocks; and acquiring the global contour reconstruction information according to the n first intermediate feature information;

inputting the transversal detail feature information into the second generator and acquiring n second intermediate feature information through n second residual blocks; and acquire the transversal detail reconstruction information according to the n second intermediate feature information;

inputting the longitudinal detail feature information into the third generator, and acquiring n third intermediate feature information through n third residual blocks; and acquiring the longitudinal detail reconstruction information according to the n third intermediate feature information;

inputting the diagonal detail feature information into the fourth generator and acquiring n fourth intermediate feature information through n fourth residual blocks; and acquiring the diagonal detail reconstruction information according to the n fourth intermediate feature information.

2. The image enhancement method of claim 1, wherein the wavelet transform operation is specifically a symmetrical compactly supported orthogonal wavelet transform operation.

3. The image enhancement method of claim 1, wherein the four generative adversarial networks are specifically four relative mean generative adversarial networks.

4. The image enhancement method of claim 1, wherein the image to be processed is specifically a three-dimensional image, and the performing a wavelet transform operation on the image to be processed to acquire raw feature information of the image to be processed comprises:

performing a wavelet transform operation on the image to be processed in an x-axis direction to acquire first spectrum information;

performing a wavelet transform operation on the first spectrum information in a y-axis direction to acquire second spectrum information;

performing a wavelet transform operation on the second spectrum information in a z-axis direction to acquire third spectrum information;

acquiring the raw feature information according to the third spectrum information.

5. The image enhancement method of claim 1, wherein, before acquiring the image to be processed, further comprising:

acquiring a first sample image, and performing downsampling on the first sample image to acquire a corresponding second sample image;

training four generative adversarial networks according to the first sample image and the second sample image to acquire the trained target network, wherein the four generative adversarial networks include a generator group and a corresponding discriminator group, and the target network is the generator group in the four generative adversarial networks.

6. The image enhancement method of claim 5, wherein the training four generative adversarial networks according to the first sample image and the second sample image to acquire the trained target network comprises:

performing wavelet transformation on the first sample image to acquire first raw feature information of the first sample image, wherein the first raw feature information comprises first global contour feature information, first transversal detail feature information, first longitudinal detail feature information and first diagonal detail feature information;

performing wavelet transform on the second sample image to acquire second raw feature information of the second sample image, wherein the second raw feature information comprises second global contour feature information, second transversal detail feature information, second longitudinal detail feature information and second diagonal detail feature information;

inputting the second raw feature information into the generator group for processing to acquire corresponding sample data reconstruction information, wherein the sample data reconstruction information comprises global sample contour reconstruction information, transversal sample detail reconstruction information, longitudinal sample detail reconstruction information and diagonal sample detail reconstruction information;

inputting the first raw feature information and the sample data reconstruction information into the discriminator group for processing to acquire a corresponding discrimination output result;

calculating loss values of discriminators in the discriminator group and loss values of generators in the generator group according to the discrimination output result;

iteratively updating network parameters of the discriminators and the generators through a gradient descent backpropagation algorithm respectively according to each of the loss values of the discriminators and each of the loss values of the generators, and minimizing each of the loss values of the discriminators and each of the loss values of the generators to acquire the trained target network.

7. The image enhancement method of claim 6, wherein, after inputting the second raw feature information into the generator group for processing to acquire corresponding sample data reconstruction information, further comprising:
    performing an inverse wavelet transform operation on the sample data reconstruction information to acquire a reconstructed sample image;
    comparing the reconstructed sample image with the corresponding first sample image pixel by pixel, and calculating a pixel-by-pixel difference loss value;
    correspondingly, the iteratively updating network parameters of the discriminators and the generators through a gradient descent backpropagation algorithm respectively according to each of the loss values of the discriminators and each of the loss values of the generators and minimizing each of the loss values of the discriminators and each of the loss values of the generators to acquire the trained target network comprise:
    iteratively update the network parameters of the discriminators and the generators through the gradient descent backpropagation algorithm respectively according to each of the loss values of the discriminators, each of the loss values of the generators and the pixel-by-pixel difference loss value, and minimizing each of the loss values of the discriminators, each of the loss values of the generators and the pixel-by-pixel difference loss value to acquire the trained target network.

8. The image enhancement method of claim 7, wherein, after calculating loss values of the discriminators in the discriminator group and loss values of the generators in the generator group according to the discrimination output result, further comprising:
    acquiring a loss value of the generative adversarial network according to a discrimination loss value corresponding to each of the discriminators, a global contour weight, a texture detail weight, a transversal detail weight, a longitudinal detail weight and a diagonal detail weight;
    calculating a total loss value according to the loss value of the generative adversarial network, the pixel-by-pixel difference loss value, a loss weight of the generative adversarial network and a pixel-by-pixel difference loss weight;
    correspondingly, the iteratively updating network parameters of the discriminators and the generators through a gradient descent backpropagation algorithm respectively according to each of the loss values of the discriminators and each of the loss values of the generators and minimizing each of the loss values of the discriminators and each of the loss values of the generators to acquire the trained target network comprise:
    iteratively updating the network parameters of the discriminators and the discriminators through the gradient descent backpropagation algorithm respectively according to each of the loss values of the discriminators, each of the loss values of the generators, the pixel-by-pixel difference loss value and the total loss value, and minimizing each of the loss values of the discriminators, each of the loss values of the generators, the pixel-by-pixel difference loss value and the total loss value to acquire the trained target network.

9. The image enhancement method of claim 5, wherein the image enhancement method is applied to image enhancement of medical images, and correspondingly the first sample image is high-resolution medical image sample data.

10. A terminal device, comprising a memory, a processor and a computer program stored in the memory and executable on the processor, wherein the processor, when executing the computer program, causes the terminal device to implement steps of:
    acquiring an image to be processed;
    performing a wavelet transform operation on the image to be processed to acquire raw feature information of the image to be processed, wherein the raw feature information includes global contour feature information, transversal detail feature information, longitudinal detail feature information, and diagonal detail feature information;
    inputting the raw feature information into a trained target network for processing to acquire corresponding reconstruction feature information; wherein the reconstruction feature information includes global contour reconstruction information, transversal detail reconstruction information, longitudinal detail reconstruction information and diagonal detail reconstruction information, the target network is a generator group acquired through training a first sample image and a corresponding second sample image based on four generative adversarial networks, and resolution of the first sample image is higher than resolution of the second sample image;
    performing an inverse wavelet transform operation on the reconstruction feature information to acquire a reconstructed image; wherein resolution of the reconstructed image is higher than resolution of the image to be processed;
    wherein the trained target network comprises a first generator, a second generator, a third generator and a fourth generator, and the inputting the raw feature information into a trained target network for processing to acquire corresponding reconstruction feature information comprises:
    inputting the global contour feature information into the first generator for processing to acquire the global contour reconstruction information;
    inputting the transversal detail feature information into the second generator for processing to acquire the transversal detail reconstruction information;
    inputting the longitudinal detail feature information into the third generator for processing to acquire the longitudinal detail reconstruction information;
    inputting the diagonal detail feature information into the fourth generator for processing to acquire the diagonal detail reconstruction information;
    wherein the first generator, the second generator, the third generator and the fourth generator are all residual network structures including n residual blocks, wherein n is a positive integer; correspondingly, the inputting the raw feature information into a trained target network for processing to acquire corresponding reconstruction feature information comprises:
    inputting the global contour feature information into the first generator and acquiring n first intermediate feature information through n first residual blocks; and acquiring the global contour reconstruction information according to the n first intermediate feature information;
    inputting the transversal detail feature information into the second generator and acquiring n second intermediate feature information through n second residual blocks; and acquire the transversal detail reconstruction information according to the n second intermediate feature information;

inputting the longitudinal detail feature information into the third generator, and acquiring n third intermediate feature information through n third residual blocks; and acquiring the longitudinal detail reconstruction information according to the n third intermediate feature information;

inputting the diagonal detail feature information into the fourth generator and acquiring n fourth intermediate feature information through n fourth residual blocks; and acquiring the diagonal detail reconstruction information according to the n fourth intermediate feature information.

11. A non-transitory computer-readable storage medium storing a computer program, wherein the computer program, when executed by a processor, causes a terminal device to implement steps of:

acquiring an image to be processed;

performing a wavelet transform operation on the image to be processed to acquire raw feature information of the image to be processed, wherein the raw feature information includes global contour feature information, transversal detail feature information, longitudinal detail feature information, and diagonal detail feature information;

inputting the raw feature information into a trained target network for processing to acquire corresponding reconstruction feature information; wherein the reconstruction feature information includes global contour reconstruction information, transversal detail reconstruction information, longitudinal detail reconstruction information and diagonal detail reconstruction information, the target network is a generator group acquired through training a first sample image and a corresponding second sample image based on four generative adversarial networks, and resolution of the first sample image is higher than resolution of the second sample image;

performing an inverse wavelet transform operation on the reconstruction feature information to acquire a reconstructed image; wherein resolution of the reconstructed image is higher than resolution of the image to be processed;

wherein the trained target network comprises a first generator, a second generator, a third generator and a fourth generator, and the inputting the raw feature information into a trained target network for processing to acquire corresponding reconstruction feature information comprises:

inputting the global contour feature information into the first generator for processing to acquire the global contour reconstruction information;

inputting the transversal detail feature information into the second generator for processing to acquire the transversal detail reconstruction information;

inputting the longitudinal detail feature information into the third generator for processing to acquire the longitudinal detail reconstruction information;

inputting the diagonal detail feature information into the fourth generator for processing to acquire the diagonal detail reconstruction information;

wherein the first generator, the second generator, the third generator and the fourth generator are all residual network structures including n residual blocks, wherein n is a positive integer: correspondingly, the inputting the raw feature information into a trained target network for processing to acquire corresponding reconstruction feature information comprises:

inputting the global contour feature information into the first generator and acquiring n first intermediate feature information through n first residual blocks; and acquiring the global contour reconstruction information according to the n first intermediate feature information;

inputting the transversal detail feature information into the second generator and acquiring n second intermediate feature information through n second residual blocks; and acquire the transversal detail reconstruction information according to the n second intermediate feature information;

inputting the longitudinal detail feature information into the third generator, and acquiring n third intermediate feature information through n third residual blocks; and acquiring the longitudinal detail reconstruction information according to the n third intermediate feature information;

inputting the diagonal detail feature information into the fourth generator and acquiring n fourth intermediate feature information through n fourth residual blocks; and acquiring the diagonal detail reconstruction information according to the n fourth intermediate feature information.

12. The terminal device of claim 10, wherein the image to be processed is specifically a three-dimensional image, and the performing a wavelet transform operation on the image to be processed to acquire raw feature information of the image to be processed comprises:

performing a wavelet transform operation on the image to be processed in an x-axis direction to acquire first spectrum information;

performing a wavelet transform operation on the first spectrum information in a y-axis direction to acquire second spectrum information;

performing a wavelet transform operation on the second spectrum information in a z-axis direction to acquire third spectrum information;

acquiring the raw feature information according to the third spectrum information.

13. The terminal device of claim 10, wherein before acquiring the image to be processed, the processor, when executing the computer program, causes the terminal device to further implement steps of:

acquiring a first sample image, and performing downsampling on the first sample image to acquire a corresponding second sample image;

training four generative adversarial networks according to the first sample image and the second sample image to acquire the trained target network, wherein the four generative adversarial networks include a generator group and a corresponding discriminator group, and the target network is the generator group in the four generative adversarial networks.

14. The terminal device of claim 10, wherein the training four generative adversarial networks according to the first sample image and the second sample image to acquire the trained target network comprises:

performing wavelet transformation on the first sample image to acquire first raw feature information of the first sample image, wherein the first raw feature information comprises first global contour feature information, first transversal detail feature information, first longitudinal detail feature information and first diagonal detail feature information;

performing wavelet transform on the second sample image to acquire second raw feature information of the second sample image, wherein the second raw feature information comprises second global contour feature information, second transversal detail feature information, second longitudinal detail feature information and second diagonal detail feature information;

inputting the second raw feature information into the generator group for processing to acquire corresponding sample data reconstruction information, wherein the sample data reconstruction information comprises global sample contour reconstruction information, transversal sample detail reconstruction information, longitudinal sample detail reconstruction information and diagonal sample detail reconstruction information;

inputting the first raw feature information and the sample data reconstruction information into the discriminator group for processing to acquire a corresponding discrimination output result;

calculating loss values of discriminators in the discriminator group and loss values of generators in the generator group according to the discrimination output result;

iteratively updating network parameters of the discriminators and the generators through a gradient descent backpropagation algorithm respectively according to each of the loss values of the discriminators and each of the loss values of the generators, and minimizing each of the loss values of the discriminators and each of the loss values of the generators to acquire the trained target network.

15. The terminal device of claim 14, wherein after inputting the second raw feature information into the generator group for processing to acquire corresponding sample data reconstruction information, the processor, when executing the computer program, causes the terminal device to further implement steps of:

performing an inverse wavelet transform operation on the sample data reconstruction information to acquire a reconstructed sample image;

comparing the reconstructed sample image with the corresponding first sample image pixel by pixel, and calculating a pixel-by-pixel difference loss value;

correspondingly, the iteratively updating network parameters of the discriminators and the generators through a gradient descent backpropagation algorithm respectively according to each of the loss values of the discriminators and each of the loss values of the generators and minimizing each of the loss values of the discriminators and each of the loss values of the generators to acquire the trained target network comprise:

iteratively update the network parameters of the discriminators and the generators through the gradient descent backpropagation algorithm respectively according to each of the loss values of the discriminators, each of the loss values of the generators and the pixel-by-pixel difference loss value, and minimizing each of the loss values of the discriminators, each of the loss values of the generators and the pixel-by-pixel difference loss value to acquire the trained target network.

16. The terminal device of claim 15, wherein after calculating loss values of the discriminators in the discriminator group and loss values of the generators in the generator group according to the discrimination output result, the processor, when executing the computer program, causes the terminal device to further implement steps of:

acquiring a loss value of the generative adversarial network according to a discrimination loss value corresponding to each of the discriminators, a global contour weight, a texture detail weight, a transversal detail weight, a longitudinal detail weight and a diagonal detail weight;

calculating a total loss value according to the loss value of the generative adversarial network, the pixel-by-pixel difference loss value, a loss weight of the generative adversarial network and a pixel-by-pixel difference loss weight;

correspondingly, the iteratively updating network parameters of the discriminators and the generators through a gradient descent backpropagation algorithm respectively according to each of the loss values of the discriminators and each of the loss values of the generators and minimizing each of the loss values of the discriminators and each of the loss values of the generators to acquire the trained target network comprise:

iteratively updating the network parameters of the discriminators and the discriminators through the gradient descent backpropagation algorithm respectively according to each of the loss values of the discriminators, each of the loss values of the generators, the pixel-by-pixel difference loss value and the total loss value, and minimizing each of the loss values of the discriminators, each of the loss values of the generators, the pixel-by-pixel difference loss value and the total loss value to acquire the trained target network.

* * * * *